United States Patent
Brand et al.

(10) Patent No.: US 9,942,757 B2
(45) Date of Patent: Apr. 10, 2018

(54) IDENTIFYING A MOBILE COMPUTING DEVICE

(71) Applicant: Google Inc., Mountain View, CA (US)

(72) Inventors: Christiaan J. Brand, Danville, CA (US); Alexei Czeskis, San Jose, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 15/000,436

(22) Filed: Jan. 19, 2016

(65) Prior Publication Data

US 2017/0208463 A1  Jul. 20, 2017

(51) Int. Cl.

| | |
|---|---|
| *H04M 1/66* | (2006.01) |
| *H04W 12/06* | (2009.01) |
| *H04B 1/3816* | (2015.01) |
| *H04L 29/06* | (2006.01) |
| *H04L 9/32* | (2006.01) |
| *H04L 29/12* | (2006.01) |
| *H04W 12/04* | (2009.01) |

(52) U.S. Cl.
CPC .......... *H04W 12/06* (2013.01); *H04B 1/3816* (2013.01); *H04L 9/3234* (2013.01); *H04L 63/0853* (2013.01); *H04L 63/0876* (2013.01); *H04L 61/6054* (2013.01); *H04W 12/04* (2013.01)

(58) Field of Classification Search
CPC .... H04W 12/06; H04W 12/04; H04B 1/3816; H04L 63/0853; H04L 61/6054
See application file for complete search history.

(56) References Cited

U.S. PATENT DOCUMENTS

| 8,874,110 B2 | 10/2014 | Agevik et al. |
| 2010/0188975 A1 | 7/2010 | Raleigh |
| 2012/0144457 A1* | 6/2012 | Counterman ......... H04L 9/3271 726/5 |

(Continued)

FOREIGN PATENT DOCUMENTS

| WO | 1998/00956 | 1/1998 |
| WO | 2012/130697 | 10/2012 |

OTHER PUBLICATIONS

International Search Report and Written Opinion in International Application No. PCT/US2016/064359, dated Mar. 20, 2017, 17 pages.

(Continued)

*Primary Examiner* — Barry Taylor
(74) *Attorney, Agent, or Firm* — Fish & Richardson P.C.

(57) ABSTRACT

A mobile computing device, such as a cellular telephone or cellular network capable tablet or PDA, can be identified by a phone number associated with the mobile computing device. A mobile computing device can include a Subscriber Identity Module (SIM) card that can be used to identify the mobile computing device and to connect the mobile computing device to a communications network operated by the communications carrier or another communications carrier. The SIM card can include memory for storing an International Mobile Subscriber Identity (IMSI). The IMSI can be used to identify the mobile computing device. A computing system can use the IMSI to request device authentication values and/or a phone number for the mobile computing device from a carrier associated with the mobile computing device.

20 Claims, 6 Drawing Sheets

(56) References Cited

U.S. PATENT DOCUMENTS

| | | | | |
|---|---|---|---|---|
| 2012/0253957 | A1* | 10/2012 | Bakshi | H04L 63/107 |
| | | | | 705/18 |
| 2013/0203408 | A1* | 8/2013 | Dowds | H04W 8/02 |
| | | | | 455/432.1 |
| 2014/0189808 | A1 | 7/2014 | Mahaffey et al. | |
| 2016/0104146 | A1* | 4/2016 | Peyton | G06Q 20/325 |
| | | | | 705/44 |
| 2016/0192179 | A1* | 6/2016 | Huber | H04W 8/265 |
| | | | | 455/411 |
| 2016/0353274 | A1* | 12/2016 | Chichierchia | H04B 1/3816 |
| 2016/0360403 | A1* | 12/2016 | Jordi | H04L 63/0435 |

OTHER PUBLICATIONS

'www.developer.com' [online] "Using Android Telephony Manager," Krishnarah Varma, Jun. 13, 2010, [retrieved Apr. 19, 2017] Retrieved from Internet: URL<http://www.devlper.com/2010/06/using-android-telephonymanager/> 17 pages.

* cited by examiner

IDENTIFYING A MOBILE COMPUTING DEVICE

TECHNICAL FIELD

This document generally relates to identifying a mobile computing device.

BACKGROUND

It is often beneficial for an application running on a computing device or a remote computing system that is interacting with a computing device to be able to identify the computing device. In the case of mobile computing devices such as cellular phones or other computing devices having cellular capability (e.g., cellular network enabled tablet devices), the mobile computing device can be identified by a phone number associated with the mobile computing device. One method for obtaining a phone number for a mobile computing device is to request that a user of the mobile computing device enter the phone number for the mobile computing device. For example, an application running on the mobile computing device can prompt the user to enter the phone number for the mobile computing device. The application can then cause the mobile computing device to transmit the entered phone number to a remote computing system, such as an application server associated with the application. The remote computing system can use the phone number to identify the mobile computing device.

SUMMARY

This document describes techniques, methods, systems, and other mechanisms for identifying a mobile computing device. A mobile computing device, such as a cellular telephone or cellular network capable tablet or PDA, can, for example, be identified by a phone number associated with the mobile computing device. In general, a phone number that is assigned to a mobile computing device by a communications carrier is unique to that mobile computing device. A mobile computing device can include a Subscriber Identity Module (SIM) card that can be used to identify the mobile computing device and to connect the mobile computing device to a communications network operated by the communications carrier or another communications carrier. The SIM card can include memory for storing an International Mobile Subscriber Identity (IMSI). The IMSI can be used to identify the mobile computing device.

In some cases, a remote computing system can use the IMSI stored on the SIM card of a mobile computing device to obtain a phone number for the mobile computing device from the communications carrier. For example, a remote computing system such as an application server can be in communication with the mobile computing device. The application server can communicate with an application (e.g., a "mobile app") executing on the mobile computing device and exchange information with the application. The application can initiate a process to authenticate the mobile computing device, or to allow a user of the mobile computing device to login to the application without the user having to enter a phone number of the computing device or otherwise provide identifying information at the time of logging in. The application can make a request to the operating system of the mobile computing device to initiate the authentication or login process. The operating system communicates with the SIM card and requests the IMSI stored on the SIM card. The SIM card provides the IMSI to the operating system, which causes the mobile computing device to transmit the IMSI to the application server along with a request to authenticate the mobile computing device and/or perform a login process for the user.

The application server then receives the IMSI and provides the IMSI to the communications carrier for the mobile computing device, along with an authentication request. The communications carrier responds by providing a challenge value (e.g., a randomly generated number) along with an expected response for the challenge value. The application server stores the expected response for the challenge value, and provides the challenge value to the mobile computing device. The operating system of the mobile computing device provides the challenge value to the SIM card. The SIM card uses the challenge value and a secret cryptographic key stored in memory of the SIM card to calculate a response value. The SIM card provides the response value to the operating system, which provides the response value to the application server. The application server compares the response value received from the mobile computing device with the expected response for the challenge value as provided by the communications carrier. If the two values match, the application server identifies that the mobile computing device is authentic (i.e., the mobile computing device is the device associated with the provided IMSI). The application server can then use the IMSI for the mobile computing device to request the phone number for the mobile computing device from the communications carrier. The communications carrier then responds by providing the phone number for the mobile computing device. This allows the application server to obtain the phone number for mobile computing device without requiring the user to enter the phone number into the mobile computing device, and without the phone number being transmitted from the mobile computing device to the application server.

In general, one innovative aspect of the subject matter described in this specification can be embodied in methods that include the actions of: receiving, at a computing system, from a mobile computing device, and as part of an IP (Internet Protocol) formatted communication, a request to obtain a unique identifier for the mobile computing device, the request including a hardware identifier that identifies a portion of hardware of the mobile computing device, wherein the hardware identifier is different from the unique identifier; transmitting, from the computing system to a communications carrier that provides the mobile computing device with wireless service, in response to the computing system receiving the request to obtain the unique identifier for the mobile computing device, a verification request that includes the hardware identifier; receiving, from the communications carrier in response to the computing system having transmitted the verification request, a verification challenge value and an expected verification response value; providing, by the computing system and to the mobile computing device, the verification challenge value; receiving, at the computing system and from the mobile computing device, a calculated verification response that the mobile computing device calculated using both the verification challenge value and a cryptographic key stored at the mobile computing device; authenticating the mobile computing device, by the computing system, by determining that the calculated verification response matches the expected verification response value; transmitting, by the computing device to the communications carrier, a request for the unique identifier for the mobile computing device, the request for the unique identifier including the hardware identifier; and receiving, by the computing system from the communications carrier, the unique identifier for the mobile computing device in response to the request for the unique identifier.

These and other embodiments can each optionally include one or more of the following features. Transmitting of the verification request by the computing system to the communications carrier can cause the communications carrier to access a database of trusted entities to identify that the computing system is a trusted entity prior to providing the verification challenge value and the expected verification response value to the computing system. The hardware identifier can be an International Mobile Subscriber Identity (IMSI) for a Subscriber Identity Module (SIM) card of the mobile computing device. Transmitting of the verification request and the hardware identifier to the communications carrier can include communicating with the communications carrier using Signaling System No. 7 (SS7) protocol. Receiving the request to obtain a unique identifier from the mobile computing device can include receiving the request to obtain a unique identifier for the mobile computing device through a network of a different communications carrier than the communications carrier that provides the mobile computing device with wireless service. The computing system can use the unique identifier for the mobile computing device to access an account for a user of the mobile computing device. The unique identifier for the mobile computing device can be a phone number for the mobile computing device. The request to obtain a unique identifier for the mobile computing device can be initiated by an application running on the mobile computing device and the phone number can be used by the computing system to route communications from a different instance of the application running on a different computing device to the application running on the computing device. The computing system can use the phone number to log a user of the mobile computing device into an application running on the mobile computing device. The computing system can use the unique identifier for the mobile computing device to authenticate the mobile computing device. The computing system can permit a user of the mobile computing device to access certain features of the application in response to authenticating the mobile computing device using the unique identifier.

Particular implementations can, in certain instances, realize one or more of the following advantages. A remote computing system can securely identify a mobile computing device in communication with the remote computing system. A remote computing system in communication with a mobile computing device can authenticate the mobile computing device. A user of an application running on a mobile computing device can login to the application to access restricted functionality of the application without having to enter a phone number or other identifying information into the application on the mobile computing device. A remote computing system can obtain a phone number or other unique identifier for a mobile computing device without the phone number or unique identifier being transmitted from the mobile computing device to the remote computing system. A remote computing system can access a phone number for a mobile computing device in a secure manner from a trusted communications carrier or other trusted network.

The details of one or more implementations are set forth in the accompanying drawings and the description below.

Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
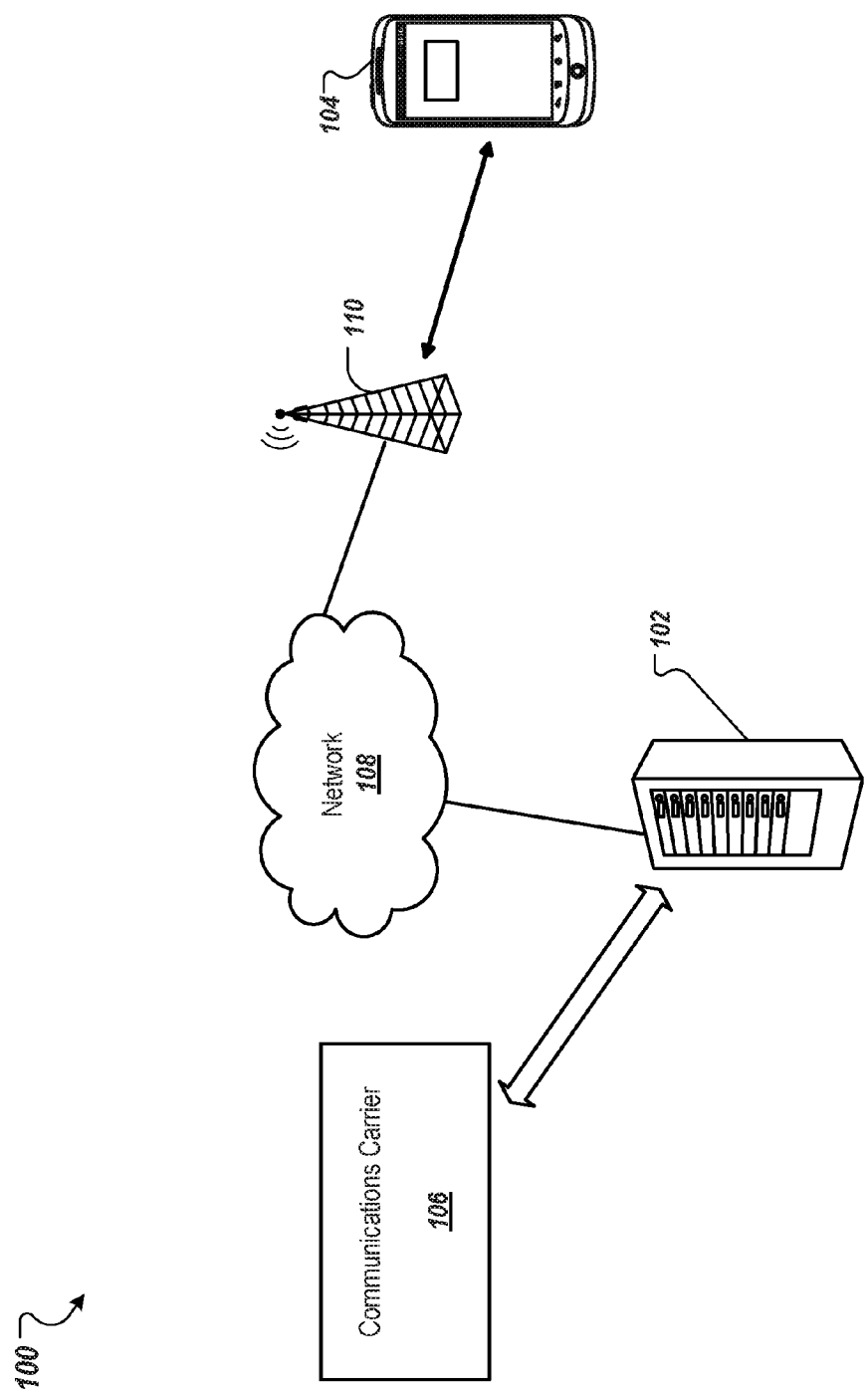
FIG. 1 is a diagram of an example environment in which a computing system can communicate with a mobile computing device and a communications carrier to obtain an identifier for the mobile computing device.

This document generally describes the identification of a mobile computing device. In general, it can be helpful for a mobile computing device or an application program operating thereon to access an identifier that uniquely identifies the mobile device, such a phone number that is associated with use of the mobile device. For example, the phone number can be used to uniquely identify the mobile device. The phone number can also be used to "login" a user of the mobile device on a remote computing system. For example, a remote application server can be associated with one or more applications on the mobile device. The remote application server can use the phone number for the mobile device to identify the mobile device and login a user of the mobile device to allow the user to access information or features associated with one or more applications. As another example, the phone number for the mobile device can be used to facilitate payments for access to certain features of an application, purchase of digital content, purchase of physical merchandise, or purchase of services.

The phone number may be unique to a Subscriber Identity Module (SIM) card that is electrically coupled to the mobile computing device. While the SIM card may not store the phone number, the SIM card may store an identifier (e.g., the International Mobile Subscriber Identity (IMSI)) that the mobile computing device can use to retrieve the phone number from a remote system.

A difficulty with a mobile computing device using the IMSI number to directly request the phone number, is that the IMSI number may not be accurate (e.g., if the SIM card is illegitimate, or if a malicious program provides the mobile computing device with an inaccurate IMSI number). As such, it is beneficial for a remote computing system to provide a service by which the mobile computing device can send to a remote computing system a hardware identifier (e.g., the IMSI number) that the remote computing system can use to verify the identity of the mobile computing device without requiring the mobile computing device to send the phone number to the remote computing system.

In some examples, such a service could be provided by an organization that developed an operating system of the mobile computing device. For example, the operating system can communicate with the SIM card to obtain the hardware identifier (IMSI) for the SIM card. The operating system can obtain the hardware identifier for its own purposes or those of an application program thereon, or to verify that a hardware identifier that is stored by the mobile computing device is accurate. In some examples, the mobile computing device sends a request to the remote service, where the request may include a hardware identifier, such as the IMSI number.

The computing system that operates the service may receive the request, and in response send a separate request that also includes the hardware identifier to a computing system of a communications carrier that provides wireless communications services for the mobile device. For example, the communications carrier may be a telephone company that operates a cellular network that the mobile computing device uses to send and receive telephone calls and communicate over the internet. As such, the communications carrier may have computer applications that are able to resolve a telephone number of the mobile computing device from the associated hardware identifier (e.g., IMSI number). The communications carrier computing system may store the hardware identifier and may assign to the hardware identifier a cryptographic key. This association of a cryptographic key with the hardware identifier can be performed, for example, at the time a SIM card is manufactured such that an identical key can be stored in memory of the SIM card. The communication carrier computing system may provide the key as an input to a cryptographic mathematical algorithm, which in return may use the key along with a verification challenge value code (e.g., a randomly generated number) to generate an expected verification response value code. The communication carrier computing system may send the generated verification challenge value code and the expected verification response value code to the remote computing system.

After receiving the verification challenge value code and the expected verification response value code, the computing system may send the verification challenge value code to the mobile computing device. The computing system may store the expected verification response code without sending it to the mobile computing device (which may never store or have access to the verification response code).

The mobile computing device may receive the verification challenge value code and provide the verification challenge value code as an input to another cryptographic mathematical algorithm, which in response may generate a calculated verification response code. For example, the operating system of the mobile device can provide the received verification challenge code to the SIM card. The SIM card can use the received verification challenge code and the cryptographic key stored in memory of the SIM card to calculate a verification response code, which the SIM card then provides back to the operating system. The mobile computing device may provide this calculated verification response code to the remote computing system.

The remote computing system may then receive the calculated verification response code and compare it to the expected verification response value code. A purpose of this is to see if the mobile computing device not only has the hardware identifier that is associated with a telephone number, but if the mobile computing device also stores they cryptographic key that is associated with that hardware identifier (where the association between the cryptographic key and the hardware identifier may not be publicly available or identifiable). This process allows the remote computing system to verify that the mobile device possesses the correct cryptographic key associated with the hardware identifier without allowing the remote computing system to access the cryptographic key. In other words, a device may not be able to "spoof" its hardware identifier, because the device would have to verify that hardware identifier using a secret key that was previously assigned to the hardware identifier by another device. Should the calculated and expected verification response value codes match, the remote computing system may designate the hardware identifier as authentic. In other words, the computing system may have verified that the hardware associated with the hardware identifier (e.g., SIM card associated with the IMSI number), is authentic.

With knowledge that the hardware identifier is correct, the remote computing system may request the phone number from a remote system (e.g., the communication carrier computing system), or may designate a telephone number that was previously received in response to a request using the hardware identifier, as authenticated for the hardware identifier.

FIG. 1 shows a diagram of an example environment 100 in which a computing system 102 can communicate with a mobile computing device 104 and a communications carrier 106 to obtain an identifier for the mobile computing device 104. The mobile computing device 104 can be, for example, a cellular telephone or a cellular communication enabled tablet device. As another example, the mobile computing device 104 can be a device that is not cellular-communication enabled, but can communicate wirelessly using one or more other communications protocols. The computing system 102 can be a set of one or more networked computers or servers that are associated with a service. For example, the computing system 102 can be an application server or a set of networked servers acting as a single application server entity. The computing system 102 can provide one or more applications that can be executed by the mobile computing device 104. For example, the computing system 102 can include storage devices for storing software for various applications (e.g., "mobile apps") that can be run by the mobile computing device 104. The mobile computing device 104 can access the computing system 102 to download one or more applications from the computing system 102. The mobile computing device 104 can then install and run the downloaded applications. The computing system 102 can also provide information and other services to the applications running on the mobile computing device 104.

In some implementations, the computing system 102 can also provide, or otherwise be associated with, an operating system running on the mobile computing device 104. For example, the computing system 102 can provide the operating system that can be executed on the mobile computing device 104 and can additionally provide various updates and changes to the operating system. In some implementations, the mobile computing device 104 can run an operating system that is not associated with the computing system 102. The mobile computing device 104 can also have and execute applications not associated with or not provided by the computing system 102 in addition to applications that are provided by or otherwise associated with the computing system 102.

The mobile computing device 104 can communicate with the computing system 102 through a communications network 108. The network 108 can be for example an IP (Internet Protocol) based network such as the Internet. In other examples, the network 108 can be any suitable WAN or LAN or a series of WANs and or LANs in communication with each other. The mobile computing device 104 can access the network 108 through an access point 110. The access point 110 can be, for example, a cellular tower of a cellular communications network. The cellular communications network can be, for example, the communications carrier 106 associated with the mobile computing device 104, or a different communications carrier. The mobile computing device 104 can wirelessly communicate with the access point 110, for example, using a cellular communications protocol such as the 3G or 4G cellular-communications protocols.

The cellular communications network can provide the mobile computing device 104 with access to the network 108. For example, the cellular communications network can provide access to the Internet. In this example, the mobile computing device 104 can transmit data formatted into IP packets that are then encapsulated in cellular communication protocol (e.g., 3G or 4G) packets which are transmitted to the access point 110. The cellular communications network can then decode the cellular communication protocol packets to access the information formatted as IP packets, which can then be transmitted along an IP network such as the Internet. The IP packets are then routed to the computing system 102 to facilitate communication between the computing system 102 and the mobile computing device 104.

As another example, the access point 110 can be an access point for an internet service provider. For example, the access point 110 can be a WiFi access point for an internet service provider. The mobile computing device 104 can communicate with the access point 110 using WiFi protocol. The internet service provider can route data received from the mobile computing device 104 through the network 108 to the computing system 102.

In some instances, the computing system 102 may need to securely identify the mobile computing device 104. For example, a user of the mobile computing device 104 can start an application on the mobile computing device 104. The application can communicate with the computing system 102 to receive information, including content. The computing system 102 may require the user to login to access certain features or content of the application running on the mobile computing device 104. The computing system 102 can login the user without the user entering a telephone number for the mobile computing device 104 or other identifying information by securely obtaining an identifier for the mobile computing device 104, such as the phone number for the mobile computing device 104. There can be other situations in which the computing system 102 may need to access the phone number for the mobile computing device 104, such as to verify that the mobile computing device 104 is actually the computing device associated with a particular account, or to route communications to the mobile computing device 104.

An application running on the mobile computing device 104 can initiate a process that allows the computing system 102 to securely obtain an identifier (such as a phone number) for the mobile computing device 104, for example, to authenticate the identity of the mobile computing device 104. For example, the user of the mobile computing device 104 can start the application. Upon start up, the application running on the mobile computing device 104 can communicate with the computing system 102. The computing system 102 can, for example, indicate to the application that the user is required to login to access certain features or content. As another example, the computing system 102 can indicate to the application that the computing system 102 needs to access the phone number of the mobile computing device 104 to perform one or more activities in association with execution of the application on the mobile computing device 104. As another example, the application can determine that the computing system 102 needs to access the phone number for the mobile computing device 104 to perform one or more functions without receiving an indication from the computing system 102 that the phone number is required (or, in some cases, without communicating with the computing system 102 prior to making the determination).

The application can initiate the process by communicating with an operating system of the mobile computing device 104. The application can indicate to the operating system that a request for an identifier for the mobile computing device 104 (e.g., a phone number) should be transmitted to the computing system 102 along with a hardware identifier that identifies all or part of the hardware of the mobile computing device 104. The hardware identifier can be, for example, a unique number, string of characters, or other identifier that uniquely identifies a specific hardware component of the mobile computing device 104. As a specific example, the hardware identifier can be an IMSI number that uniquely identifies the SIM card of the mobile computing device 104. In this example, the operating system can request the IMSI from the SIM card of the mobile computing device 104. The SIM card can, for example, store the IMSI in memory that is internal to the SIM card.

The SIM card can also store a secret cryptographic key (often referred to as a "Ki") in memory of the SIM card. In some implementations, the operating system may request the hardware identifier from a different component of the mobile computing device 104. For example, a different module within the mobile computing device 104 for enabling communication may possess or otherwise be associated with a unique hardware identifier. In some implementations, the hardware identifier may be a unique identifier that identifies the entire mobile computing device 104. In some implementations, the operating system may retrieve the hardware identifier from memory that is accessible by the operating system. In some implementations, the application running on the mobile computing device 104 does not need to communicate with the operating system to obtain the hardware identifier. For example, the application can communicate directly with the SIM card to obtain the hardware identifier (e.g., the IMSI of the SIM card) or can access memory where the hardware identifier is stored. In some implementations, the application is the operating system.

The mobile computing device 104 communicates the hardware identifier (e.g., the IMSI of the SIM card) to the computing system 102. For example, the operating system of the mobile computing device 104 causes communications components of the mobile computing device 104 to transmit a communication to the computing system 102 that includes the hardware identifier. The communication from the mobile computing device 104 to the computing system 102 also includes a request to obtain a unique identifier (e.g., phone number) for the mobile computing device 104 and/or otherwise authenticate the mobile computing device 104. In some implementations, this communication between the mobile computing device 104 and the computing system 102 is performed using Internet Protocol formatted communications. For example, the mobile computing device 104 can communicate with the access point 110 using a cellular communication protocol to access the network 108, which in this example is an IP network, to communicate with the computing system 102 using IP. As another example, the access point 110 can be an access point for an IP network, such as a wireless WiFi router in communication with the network 108. In some implementations, the operating system can provide the IMSI for the SIM card to the application running on the mobile computing device 104. The application can then cause the IMSI to be transmitted to the computing system 102 by the mobile computing device 104.

The computing system 102 receives the request to obtain the unique identifier (e.g., phone number) for the mobile computing device 104 along with the hardware identifier (e.g., IMSI). The computing system 102 can then transmit the IMSI along with an authentication request to the communications carrier 106. The communications carrier 106 is a communications carrier that provides communications service for the mobile computing device 104. For example, the communications carrier 106 can be a cellular communications carrier that provides cellular phone service for the mobile computing device 104. In some implementations, the access point 110 can be an access point for accessing a communications network of the communications carrier 106. In some implementations, the access point 110 can belong to a communications carrier that is different from or separate from the communications carrier 106. For example, the mobile computing device 104 can be "roaming" on a cellular network that owns or operates the access point 110. In some implementations, as mentioned above, the access point 110 is not affiliated with a cellular communications carrier.

In some implementations, the computing system 102 can identify that the request including the hardware identifier (IMSI) should be transmitted to the communications carrier 106 (rather than a different communications carrier) using information included in the hardware identifier itself. For example, an IMSI can include a country identifier in the first few characters of the IMSI. The next set of characters in the IMSI can be used to identify the communications carrier 106 as the correct communications carrier for the mobile computing device 104. The remaining characters in the IMSI can be used to uniquely identify the SIM card of the mobile computing device 104.

The mobile computing device 104 can communicate with the communications carrier 106 using a secure communications protocol. For example, the computing system 102 can communicate with the communications carrier 106 using Signaling System No. 7 (SS7) protocol. As a more specific example, the computing system 102 can communicate with the communications carrier 106 using the SS7-Mobile Application Part (SS7-MAP) protocol. In some implementations, the computing system 102 communicates with the communications carrier 106 over an interoperable protocol that is used by communications carriers to communicate with each other.

In some implementations, the computing system 102 is required to receive authorization to communicate with the communications carrier 106 prior to sending the request to authenticate the hardware identifier for the mobile computing device 104 to the communications carrier 106. For example, the communications carrier 106 can require that communications regarding authorization of mobile devices using hardware identifiers (such as IMSIs) must occur over one or more particular interoperable protocols used by communications carriers to communicate with one another (such as SS7-MAP). The computing system 102 (or a business entity associated with the computing system 102) can petition to be approved to be listed on a registry of trusted entities before being permitted to communicate with the communications carrier 106 and other communications carriers. For example, communications carrier 106 may only permit other trusted entities to communicate with the communications carrier 106 over certain SS7 communications channels. The communications carrier 106 can access a database of trusted entities to identify whether the computing system 102 is authorized to communicate with the communications carrier 106 using SS7 (or another specific communication protocol). The communications carrier 106 can also identify if the computing system 102 is a trusted entity using the database of trusted entities before responding to any requests for authentication based on a hardware identifier (such as the IMSI for the SIM card of the mobile computing device 104).

The communications carrier 106 can respond to the request (that includes the hardware identifier for the mobile computing device 104) from the computing system 102 by providing a verification challenge value and an expected verification response value. For example, the communications carrier 106 receives the request from the computing system 102 that includes the IMSI for the SIM card of the mobile computing device 104. The communications carrier 106 can access a memory location that includes a list of trusted entities that are allowed to perform IMSI based verification of mobile devices (or to access a phone number for a mobile device using the IMSI for the mobile device). The communications carrier 106 can use this information to determine that the computing system 102 is a trusted entity and is permitted to perform IMSI based authentication and/or is permitted to receive the phone number for the mobile computing device 104. Upon determining that the computing system 102 is a trusted entity, the communications carrier 106 responds by providing the verification challenge value and the expected verification response value for the verification challenge value.

The communications carrier 106 can store or access a lookup table that stores information for mobile devices, including the mobile computing device 104. The look up table can include unique device identifiers (e.g., phone numbers), unique hardware identifiers (e.g., IMSIs), and cryptographic keys for various mobile devices that receive service from the communications carrier 106. For example, the communications carrier 106 can use the IMSI for the SIM card of the mobile computing device 104 to look up the phone number for the mobile computing device 104 and to access the secret cryptographic key for the mobile computing device 104. In some implementations, the stored secret cryptographic key that is accessed by the communications carrier 106 is identical to the secret cryptographic key stored at the SIM card of the mobile computing device 104.

The communications carrier 106 can use the accessed secret cryptographic key to generate the expected verification response value based on the verification challenge value. For example, the verification challenge value can be a randomly generated number or string of characters. The communications carrier 106 can use the randomly generated verification challenge value and the accessed secret cryptographic key to calculate the expected verification response value. In some implementations, the verification challenge value is not a randomly generated value, but is rather a stored value, or a value obtained through other means.

The computing system 102 receives the verification challenge value and the expected verification response value from the communications carrier 106. This information can be received over the same secure communications protocol that was used to transmit the request to the communications carrier 106, such as the SS7-MAP protocol. The computing system 102 stores the expected verification response value and provides the verification challenge value. In some implementations, the expected verification response value is never provided to the mobile computing device 104.

The mobile computing device 104 receives the verification challenge value from the computing system 102. For example, the operating system of the mobile computing device 104 can initially receive the verification challenge value as a response to the request by the mobile computing device 104 to authenticate the mobile computing device 104. The operating system of the mobile computing device 104 provides the verification challenge value to the SIM card. The SIM card in turn uses the verification challenge value and the secret cryptographic key stored in memory of the SIM card to calculate an actual response value. The SIM card provides the calculated actual response value to the operating system which in turn provides the actual response value to the computing system 102. For example, the mobile computing device 104 can access the network 108 using the access point 110 to transmit the actual response value to the computing system 102.

Upon receiving the actual response value from the mobile computing device 104, the computing system 102 compares the actual response value to the expected verification response value received from the communications carrier 106 to determine if the two values match. If the actual response value matches the expected verification response value, the computing system 102 can determine that the mobile computing device 104 is authentic. For example, the computing system 102 can determine that the SIM card for the mobile computing device 104 is the actual SIM card associated with the previously provided IMSI, and is not a different SIM card that has been corrupted or has been tampered with to mimic the SIM card associated with the IMSI and impersonate that SIM card. In other words, the authentication process that includes ensuring that the actual response value returned by the mobile computing device 104 matches the expected verification response value provided by the communications carrier 106 ensures that the computing system 102 is not communicating with a mobile computing device 104 having an altered SIM card that is impersonating another device.

Upon verifying the authenticity of the mobile computing device 104 (or the authenticity of a hardware component of the mobile computing device 104, such as the SIM card) the computing system 102 can transmit a request to the communications carrier 106 for a unique identifier (such as a phone number) for the mobile computing device 104. The request can include the previously-received hardware identifier for the mobile computing device 104. For example, the computing system 102 can transmit a request to the communications carrier 106 using SS7-MAP protocol. The request can include the IMSI for the SIM card of the mobile computing device 104 and request the phone number of the mobile computing device 104.

In response to receiving the request for the unique identifier for the mobile computing device 104, the communications carrier 106 provides the unique identifier to the computing system 102. For example, the communications carrier 106 can receive the request from the computing system 102. The request can include the IMSI for the SIM card of the mobile computing device 104. The communications carrier 106 can use the look-up table to identify the corresponding phone number for the provided IMSI. The communications carrier 106 can then provide the phone number to the computing system 102. In some implementations, the communications carrier 106 only provides the unique identifier for the mobile computing device 104 to the computing system 102 after determining that the computing system 102 is a trusted entity. This process allows the computing system 102 to receive the unique identifier for the mobile computing device 104 directly from the communications carrier 106 in a secure fashion without the unique identifier being transmitted from the mobile computing device 104 to the communications carrier 106.

The computing system 102 can use the received unique identifier for the mobile computing device 104 to perform various functions. For example, the computing system 102 may associate the unique identifier (e.g., phone number) for the mobile computing device 104 with the user of the mobile computing device 104. In essence, the computing system 102 can use the unique identifier as an identifier for the user in addition to an identifier for the mobile computing device 104. Because the unique identifier and the mobile computing device 104 have been authenticated (using the above described process) the computing system 102 can use the unique identifier to log the user into one or more accounts associated with one or more applications running on the mobile computing device 104. For example, the computing system 102 can use the phone number for the mobile computing device 104 to log the user into an account that is associated with a game executing on the mobile computing device 104. The game may require the user to login prior to permitting the user to play the game (e.g., the game may a subscription based game, or require that the user have purchased access to the game). The computing system 102 can use the above described process to access the phone number for the mobile computing device 104 and log the user into her account for the game to permit the user to play the game on the mobile computing device 104.

As another example, an application may provide some content or information to the user without requiring the user to log in, but may require the user to log in to access other content or information. For example, a news application may provide top news stories for free, while requiring a user to login to a paid account for access to other types of stories such as sports or lifestyle. As another example, a game running on the mobile computing device 104 may permit access to certain levels without requiring the user to log in, but may require a login before the user is permitted to access other, restricted levels. As another example, an application may require a user to log in, prior to receiving financial information, such as information on the performance of the user's stock portfolio.

This login can be performed by the computing system 102 using the unique identifier received from the communications carrier 106. Upon successfully logging the user into one or more accounts associated with one or more applications running on the mobile computing device 104, the computing system 102 can provide one or more authorization messages to the applications running on the mobile computing device 104 that allow the user to access restricted content or information that requires a login. As another example, the computing system 102 can provide additional information to the mobile computing device 104 in response to the user being successfully logged in using the unique identifier for the mobile computing device 104 that was received from the communications carrier 106.

The unique identifier can also be used to route communications to the mobile computing device 104. For example, a messaging application may facilitate the exchange of messages between the mobile computing device 104 and other computing devices. For example, a messaging app that exchanges messages through the Internet using Internet Protocol may use the phone number for the mobile computing device 104 to identify the mobile computing device 104 even if the messages are not routed using a traditional SMS messaging protocol. The computing system 102 can use the phone number received from the communications carrier 106 to route messages intended for the mobile computing device 104 (because it is associated with the phone number) to the mobile computing device 104. For example, a different user that is executing the messaging app on a different computing device can send a message to the phone number for the mobile computing device 104. The computing system 102 can identify that the message is intended for the mobile computing device 104 based on the message being sent to the phone number. The computing system 102 can then route the message to the messaging app running on the mobile computing device 104.

As another example, certain applications may require access to a user's phone number for purposes of identifying the user, or simply to collect contact information for the user in the case that the user needs to be contacted in the future. The above described process allows the computing system 102 to obtain the user's phone number without requiring the user to manually enter the phone number into the application. For example, an application that facilitates booking of hotel reservations may require access to a user's phone number so that the user can be contacted prior to his stay, or if a change to his reservation occurs. The above process can allow the computing system 102 (e.g., an application server associated with the hotel booking application) to access the number for the mobile computing device 104 without requiring the user to enter it manually. As another example, the computing system 102 can use the unique identifier for the mobile computing device 104 to allow the user to make online purchases of digital content (e.g., media files), physical merchandise (e.g., mail delivery of products), services (e.g., "ride sharing"), or other purchases (e.g., pizza delivery). The computing system 102 can use the phone number to facilitate purchases, for example, by using the phone number to access credit card information for the user of the mobile computing device 104, or to access the user's account with an online payment service. In some implementations, the computing system 102 can act as, or is associated with, an online payment service.

In some implementations, prior to allowing an application to initiate a process for obtaining a unique identifier for the mobile computing device 104, or otherwise authenticating the mobile computing device 104, the application must be approved to be granted access to the unique identifier. For example, the computing system 102 can determine that some applications running on the mobile computing device 104 are permitted to initiate the process for obtaining the phone number for the mobile computing device 104 while determining that other applications are not permitted to initiate such a process. Requests to authenticate the mobile computing device 104 that are initiated by applications that are not permitted to initiate such a process can be ignored by the computing system 102.

Figure 2:
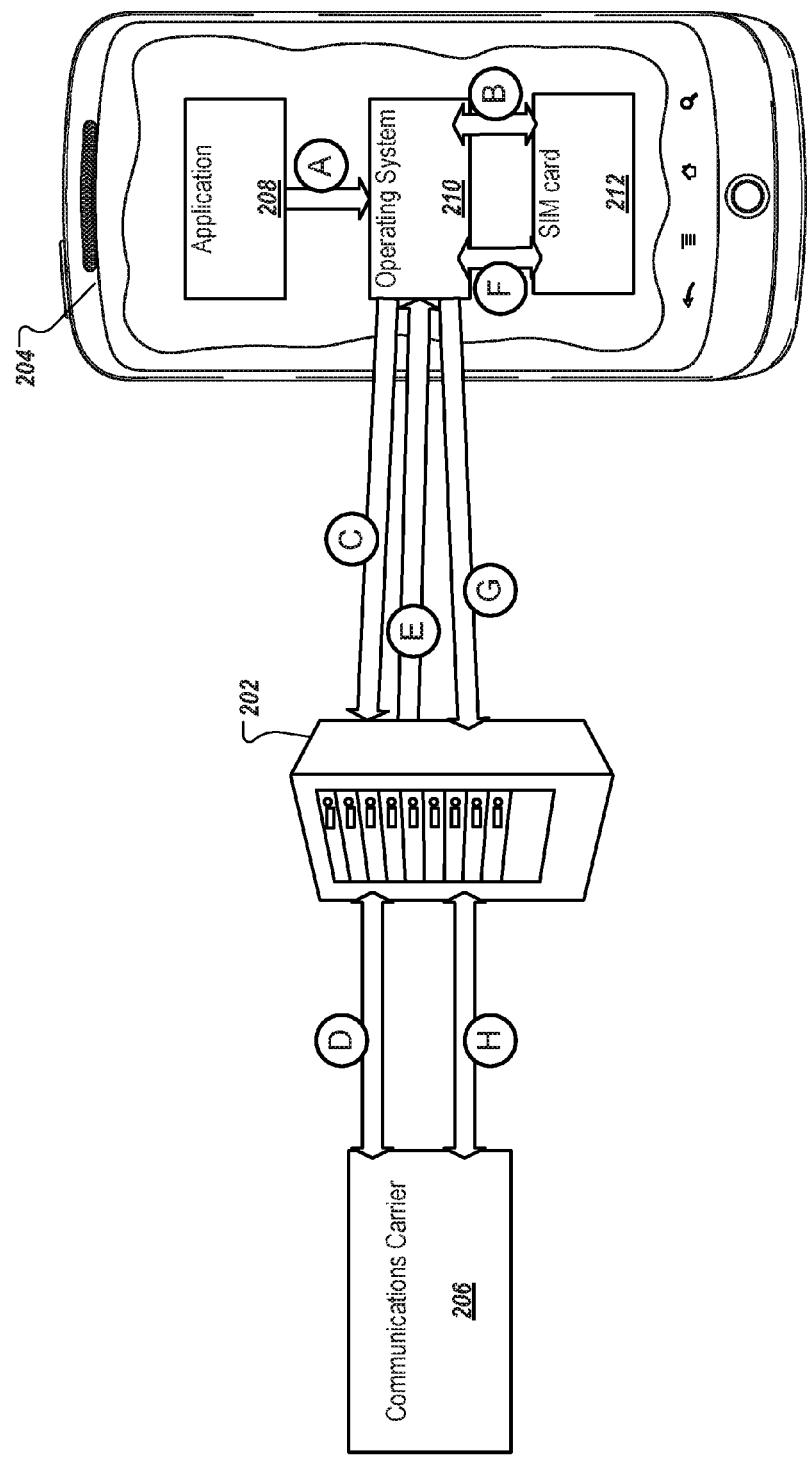
FIG. 2 is a diagram of an example data flow for a computing system communicating with a mobile computing device and a communications carrier to obtain an identifier for the mobile computing device.

Turning to FIG. 2, in an example of a flow process for authenticating a mobile computing device, a computing system 202 is in communication with a mobile computing device 204 and a communications carrier 206. FIG. 2 does not show the communications networks the facilitate communications between the computing system 202, the mobile computing device 204, and the communications carrier 206. The computing system 202 can communicate with the mobile computing device 204, for example, using Internet Protocol communications transmitted through the Internet or another IP based network. As another example, the computing system 202 can communicate with the communications carrier 206 using SS7-MAP protocol. The mobile computing device 204 includes one or more applications, including an application 208, that are capable of executing on the mobile computing device 204. The mobile computing device 204 also includes an operating system 210 executing on the mobile computing device 204. The mobile computing device 204 also includes a SIM card 212 that can be used to uniquely identify the mobile computing device 204 and facilitate communication between the mobile computing device 204 and a communications network, such as a cellular communications network of the communications carrier 206.

The computing system 202 can be an application server associated with the application 208. For example, the computing system 202 can be an application server that provides content or information that is presented by the application 208. As another example, the computing system 202 can provide updates or bug fixes for the application 208. As another example, the computing system 202 can be an online "app store" that the mobile computing device 204 accessed to download the application 208. As yet another example, the computing system 202 can provide login functionality, message routing functionality, or other functionality for the application 208. In some implementations, the computing system 202 is also associated with the operating system 210. For example, the operating system 210 can be a mobile device operating system that was received from the computing system 202 and installed on the mobile computing device 204. As another example, the computing system 202 can provide updates, bug fixes, or other functionality for the operating system 210. In some implementations, both the application 208 and the operating system 210 are associated with and receive information from the computing system 202.

At A, the application 208 initiates an authentication process. For example, the application 208 can determine that the computing system 202 requires access to a phone number of the mobile computing device 204 to permit the application 208 to provide particular content or information to a user of the mobile computing device 204. For example, the computing system 202 may need the phone number to login to a service corresponding to the application 208 prior to providing particular content or information to the application 208 for presentation to the user. As another example, the computing system 202 may require access to the phone number of the mobile computing device 204 to provide certain functionality in association with the application 208. In some implementations, the computing system 202 can indicate to the application 208 that the phone number for the mobile computing device 204 is required. This indication received from the computing system 202 can cause the mobile computing device 204 to initiate a process that allows the computing system 202 to obtain the phone number. At A, the application 208 communicates with the operating system 210 to request that the operating system 210 obtain the IMSI for the SIM card 212 and provide the IMSI to the computing system 202 along with a request to obtain the phone number for the mobile computing device 204 or otherwise authenticate the mobile computing device 204.

At B, in response to the communication from the application 208, the operating system 210 sends a request to the SIM 212 card for the IMSI stored by the SIM card 212. The IMSI uniquely identifies the SIM card 212. The SIM card 212 provides the IMSI to the operating system 210 in response to the request.

At C, the operating system 210 causes the mobile computing device 204 transmit the IMSI to the computing system 202 along with a request to authenticate the SIM card 212 using the provided IMSI. In some implementations, the computing system 202 will only act on the request from the mobile computing device 204 if the application 208 is approved to initiate such an authentication process.

At D, the computing system 202 provides the IMSI for the SIM card 212 to the communications carrier 206 along with an authentication request and the communications carrier 206 returns a verification challenge value and an expected verification response value. The request and the response can be communicated using, for example, SS7-MAP protocol. In response to receiving the IMSI and the request, the communications carrier 206 can access a cryptographic key associated with the SIM card 212 using the IMSI. For example, the communications carrier 206 can access a look up table that correlates IMSIs for various SIM cards to cryptographic keys. In some implementations, the SIM card 212 has memory storing a cryptographic key that is identical to the cryptographic key accessed by the communications carrier 206.

The communications carrier 206 uses the cryptographic key to generate the expected verification response value. For example, the verification challenge value can be a randomly generated number or string of characters. The communications carrier 206 can use the cryptographic key and the verification challenge value to calculate the expected verification response value. The communications carrier 206 provides the verification challenge value and the calculated expected verification response value to the computing system 202. The computing system 202 stores the expected verification response value for later comparison to a calculated response value provided by the mobile computing device 204.

At E, the computing system 202 provides the verification challenge value received from the communications carrier 206 to the mobile computing device 204. For example, the computing system 202 can provide the verification challenge value to the operating system 210 of the mobile computing device 204. In some implementations, the expected verification response value is never provided to the mobile computing device 204.

At F, the operating system 210 provides the verification challenge value received from the computing system 202 to the SIM card 212 and the SIM card 212 responds with an actual response value calculated using the verification challenge value. For example, the SIM card 212 receives the verification challenge value from the operating system 210 and uses the verification challenge value along with a cryptographic key stored in memory of the SIM card 212 to calculate the actual response value. The SIM card 212 then returns the actual response value to the operating system 210. In some implementations, the cryptographic key stored by the SIM card 212 is the same as the cryptographic key that was used by the communications carrier 206 to calculate the expected verification response value.

At G, the operating system 210 causes the mobile computing device 204 to transmit the actual response value calculated by the SIM card 212 to the computing system 202. The computing system 202 compares the actual response value received from the mobile computing device 204 to the expected verification response value received from the communications carrier 206. If the values to not match, the computing system 202 can determine that the SIM card 212 is not the actual SIM card associated with the previously provided IMSI, but is rather impersonating the SIM card associated with the previously provided IMSI. For example, the SIM card 212 may have been tampered with to alter the IMSI value to impersonate a different SIM card. If the actual response value and the expected verification response value match, the computing system 202 can determine that the SIM card 212 is authentic and is actually the SIM card 212 associated with the previously provided IMSI. Based on this determination, the computing system 202 can allow the application 208 to access restricted features, information, or content intended for the user of the mobile computing device 204.

At H, in response to determining that the SIM card 212 is authentic and not a cloned or imposter SIM card, the computing system 202 transmits a request for the phone number of the mobile computing device 204 to the communications carrier 206. In some implementations, the request includes the IMSI for the SIM card 212 previously provided to the computing system 202 by the mobile computing device 204. The communications carrier 206 uses the IMSI to look up the phone number for the mobile computing device 204. The communications carrier 206 then returns the phone number to the computing system 202. As described above, the computing system 202 can use the phone number to route communications to/from the mobile computing device 204, to log the user of the mobile computing device 204 into one or more services, or to facilitate payment for purchases. For example, the computing system 202 can use the phone number to log the user of the mobile computing device 204 into a service that provides information/content to the application 208 for display to the user. As another example, the computing system 202 can use the phone number to route communications to the application 208 that have been sent from other instances of the application 208 running on other computing devices. As yet another example, the application 208 can be a shopping application and the computing system 202 can use the phone number to facilitate payments for products purchased using the shopping application. As another example, the computing system 202 can use the phone number to allow the user to make in-app purchases in the application 208, such as to allow the user to purchase additional content or features within the application 208.

Figure 3:
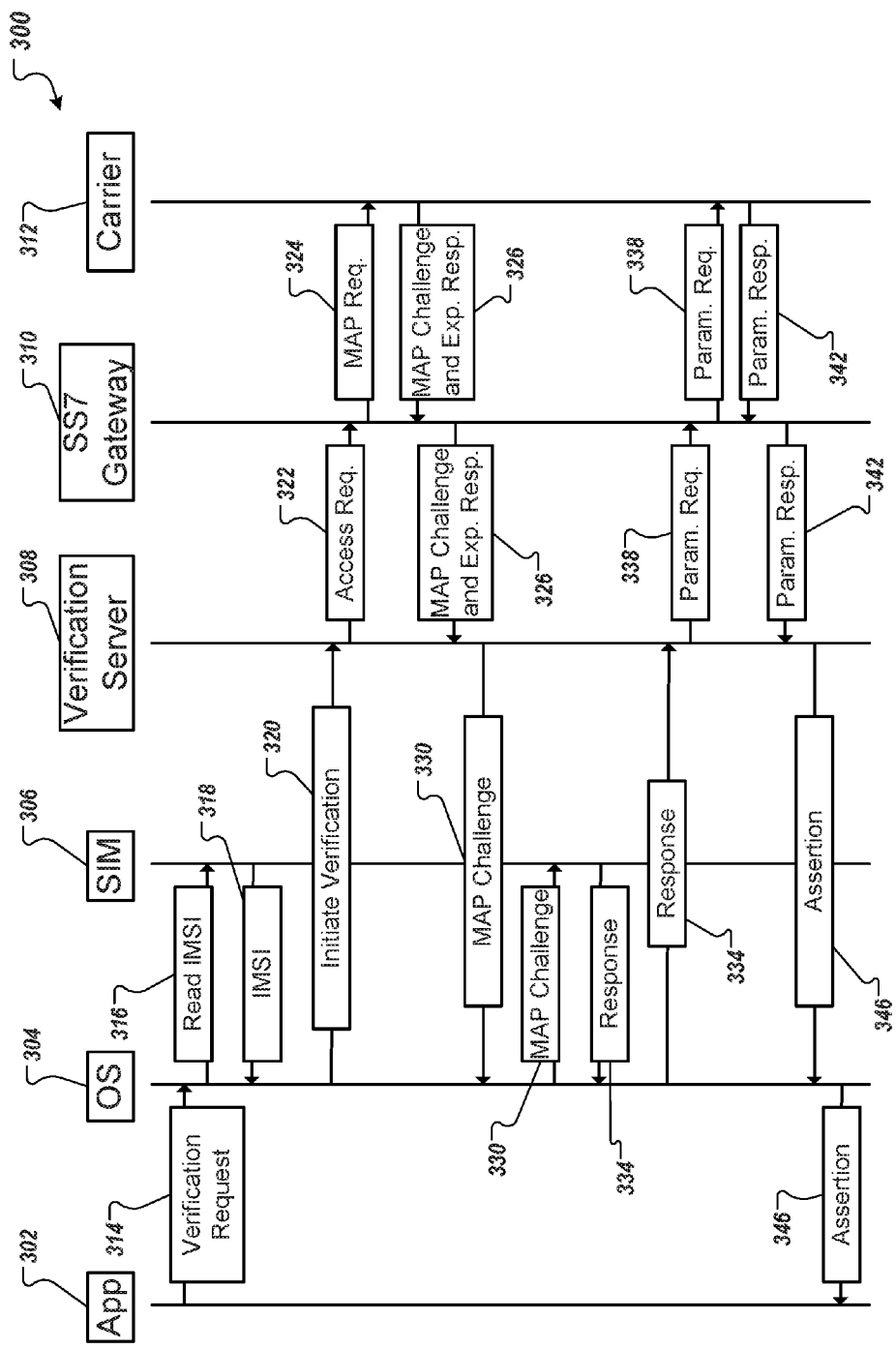
FIG. 3 is a flow lane diagram of communications between various computing entities for obtaining an identifier for a mobile computing device.

FIG. 3 shows a flow lane diagram 300 of communications between various computing entities for obtaining an identifier for a mobile computing device. Specifically, the flow lane diagram 300 shows communications between an application 302 running on a computing device, an operating system 304 running on the computing device, a SIM card 306 of the computing device, a verification server 308, an SS7 communications gateway 310, and a communications carrier 312.

The application 302 sends a verification request 314 to the operating system 304. The verification request 314 indicates that the application 302 would like to verify the identity of the computing device on which the application 302 is running. This verification is performed by verifying that the IMSI provided by the SIM card 306 is the correct IMSI for the SIM card 306.

The operating system 304 sends a read IMSI instruction 316 to the SIM card 306 of the computing device. In response, the SIM card 306 returns the IMSI 318 to the operating system 304. For example, the IMSI 318 can be stored in memory of the SIM card 306. In response to receiving the read IMSI instruction 316, the SIM card 306 accesses the memory to retrieve the IMSI 318 and provide the IMSI 318 to the operating system 304. Upon receiving the IMSI 318 from the SIM card 306, the operating system 304 sends a request to initiate verification 320 to the verification server 308. The request to initiate verification 320 includes the IMSI 318. For example, the request to initiate verification 320 can be transmitted to the verification server 308 using the IP protocol and can include the IMSI 318. The verification server 308 can be part of a computing system that is associated with the application 302. For example, the verification server 308 can be an application server, or can be associated with an application server that provides remote functionality or content for the application 302.

In response to receiving the request to initiate verification 320, the SS7 communications gateway 310 sends an access request 322 to the SS7 communications gateway 310 along with the IMSI 318. The SS7 communications gateway 310 allows the verification server 308 to communicate with the communications carrier 312 using the SS7 protocol. If the verification server 308 is authorized to communicate with the communications carrier 312 using SS7 protocol, the SS7 communications gateway 310 provides an SS7-Mobile Application Part (SS7-MAP) access request 324 to the communications carrier 312. The SS7-MAP access request 324 includes the IMSI 318. In response, the communications carrier 312 returns a MAP challenge and expected response 326 to the SS7 communications gateway 310 which in turn passes the MAP challenge and expected response 326 to the verification server 308. For example, the communications carrier 312 can use the IMSI 318 received with the SS7-Map access request 324 to retrieve a cryptographic key associated with the SIM card 306. The communications carrier 312 can then randomly generate the MAP challenge. The communications carrier 312 can use the cryptographic key and the randomly generated MAP challenge to determine the expected response. The MAP challenge and expected response are then provided to the verification server 308.

The verification server 308 stores the expected response and provides the MAP challenge 330 to the operating system 304 of the computing device. The operating system 304 in turn provides the MAP challenge 330 to the SIM card 306. The SIM card 306 uses the MAP challenge 330 to calculate a response 334 and provides the response 334 to the operating system 304. For example, the SIM card 306 can use a cryptographic key stored by the SIM card 306 along with the MAP challenge 330 to determine the result 334. The cryptographic key can be, for example, the same as the cryptographic key used by the communications carrier 312 to generate the expected response. After receiving the response 334 from the SIM card 306, the operating system 304 provides the response 334 to the verification server 308.

The verification server 308 can compare the response 334 to the previously stored expected response to determine if the response 334 and the expected response match. If the response 334 and the expected response match, the verification server 308 determines that the SIM card 306 is authentic. The verification server 308 can deem the computing device in which the SIM card 306 is installed to be a trusted device based on this determination that the SIM card 306 is authentic. In response to the determination that the SIM card 306 is authentic, the verification server 308 transmits a parameter request 338 to the SS7 communications gateway 310 which passes the parameter request 338 to the communications carrier 312. The parameter request 338 can be, for example, a request for a unique identifier for the computing device in which the SIM card 306 is installed, such as a phone number for the computing device. The parameter request 338 can include the IMSI 318. In response to the parameter request 338, the communications carrier 312 provides a parameter response 342 that is routed to the verification server 308 by the SS7 communications gateway 310. The parameter response 342 includes the requested unique identifier (e.g., the phone number for the phone on which the SIM card 306 is installed). The communications carrier 312 can identify the unique identifier for the computing device using the provided IMSI 318 for the SIM card 306.

Upon receiving the parameter response 342 that includes the unique identifier, the verification server 308 can provide an assertion 346 to the operating system 304. The operating system 304 then provides the assertion 346 to the application 302. The assertion 346 can be, for example, an instruction intended for the application 302 that instructs the application 302 to permit a user of the computing device on which the application 302 is running to access restricted features or content. For example, the assertion 346 can instruct the application 302 to permit the user to play certain restricted levels of a game. As another example, the assertion 346 can instruct the application 302 to allow the user to utilize certain features of the application 302. In some implementations, the assertion 346 includes a public identifier for the user or the computing device on which the application 302 is running. For example, the assertion 346 can include a user name for the user. The application 302 can use the user name to access an account for the user or perform functions on behalf of the user.

Figure 4:
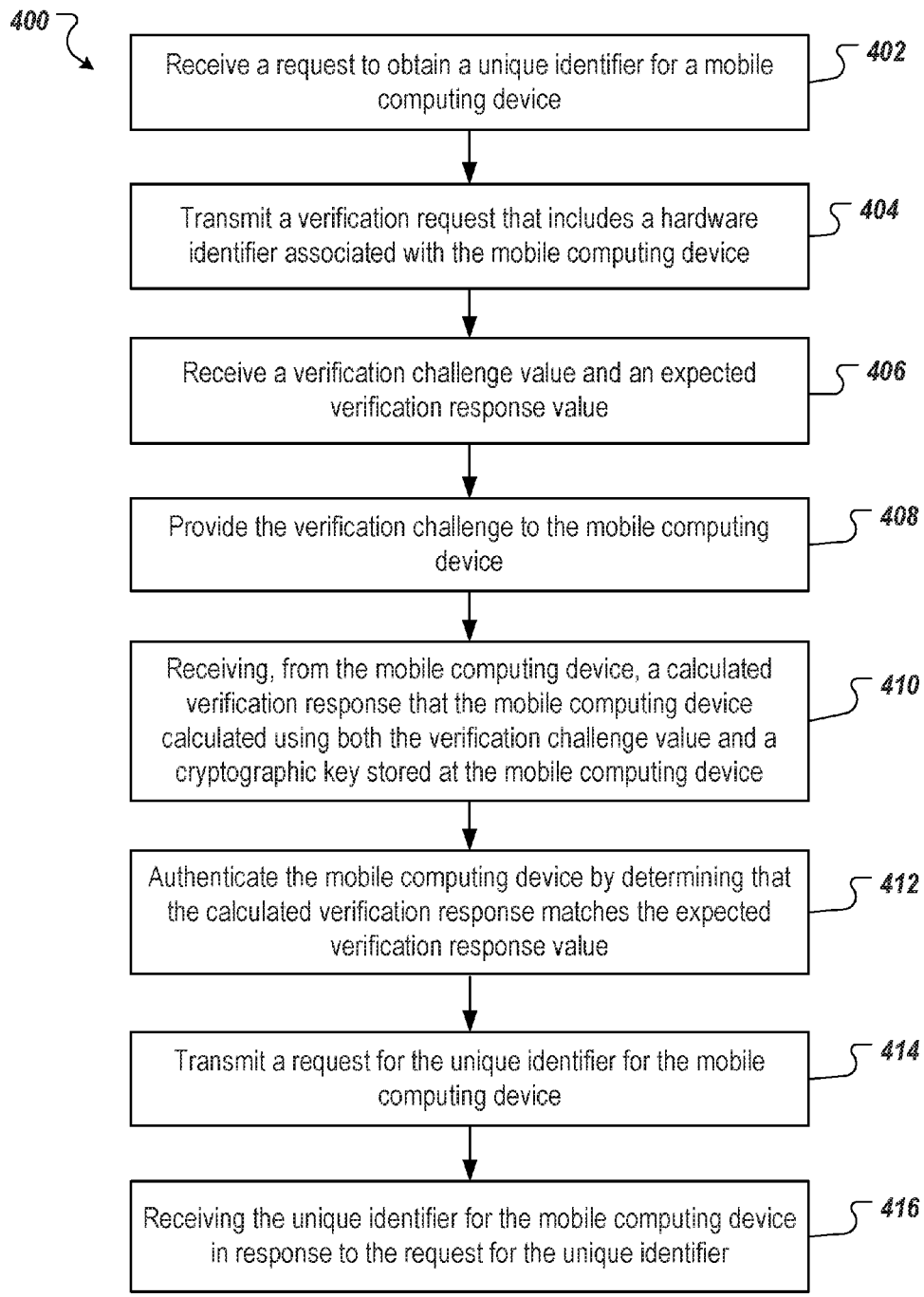
FIG. 4 is a flow chart of an example process for obtaining an identifier for a mobile computing device.

FIG. 4 shows a flow chart of an example process 400 for obtaining an identifier for a mobile computing device. The process 400 can be performed by one or more devices or systems discussed with respect to FIGS. 1-3. For example, the process 400 can be performed by the computing system 102 of FIG. 1 or the verification server 308 of FIG. 3. Operations of the process 400 can be implemented by execution of instructions stored on a non-transitory computer readable medium. Execution of the instructions causes one or more data processing apparatus to perform operations of the process 400.

A request to obtain a unique identifier for a mobile computing device is received (402). For example, a mobile computing device, such as a cell phone, can transmit a request to a verification system requesting that the verification system obtain a unique identifier for the mobile computing device. The unique identifier can be, for example, a phone number for the cell phone. The request can be formatted in IP formatted data packets.

A verification request that includes a hardware identifier associated with the mobile computing device is transmitted (404). For example, the verification system can transmit a verification request to a communications carrier that provides communications services for the mobile computing device. The communications carrier can be, for example, a cellular service provider that provides cellular communications services for the mobile computing device. The verification system can communicate with the communications carrier by using a secure communication protocol, such as the SS7 protocol. In some implementations, the hardware identifier is received along with the request to obtain the unique identifier received at 402. The hardware identifier can uniquely identify one or more hardware components of the mobile computing device. For example, the hardware identifier can be an IMSI for a SIM card installed in the mobile computing device.

A verification challenge value and an expected verification response value are received (406). For example, in response to transmitting the verification request to the communications carrier, the verification system can receive the challenge value and an expected verification response from the communications carrier. The challenge value can be, for example, a randomly generated value and the expected verification response value can be a value that is calculated by the communications carrier using the challenge value and a cryptographic key that is associated with the mobile computing device. The communications carrier can use the hardware identifier for the mobile computing device to access the cryptographic key.

The verification challenge is provided to the mobile computing device (408). For example, the verification system can provide the challenge value to the mobile computing device using IP communications. In some implementations, the expected verification response value is never provided to the mobile computing device.

A calculated verification response is received from the mobile computing device (410). The calculated verification response can be a value that is calculated by the mobile computing device using the provided verification challenge and a cryptographic key stored at the mobile computing device. For example, a hardware component (such as a SIM card) of the mobile computing device can access the cryptographic key and use the cryptographic key along with the verification challenge value to calculate the verification response. The verification response can be formatted as IP packets and communicated over an IP network.

The mobile computing device is authenticated by determining that the calculated verification response matches the expected verification response value (412). For example, the verification system can compare the calculated verification response received from the mobile computing device to the expected verification response value received from the communications carrier to determine if the two values match. If the values do not match, the verification server can determine that the previously provided hardware identifier was incorrect or that a hardware component of the mobile computing device (such as a SIM card) has been tampered with. If the calculated verification response matches the expected verification response value, the verification server determines that the mobile computing device is authentic and that the previously provided hardware identifier is the correct hardware identifier for the mobile computing device.

In response to determining that the mobile computing device is authentic, a request for the unique identifier for the mobile computing device is transmitted. For example, the verification system can send a request to the communications carrier for the mobile computing device requesting access to the phone number for the mobile computing device. The request can include the hardware identifier previously received by the verification system.

The unique identifier for the mobile computing device is received in response to the request for the unique identifier. For example, the verification system can receive the unique identifier from the communications carrier. The unique identifier can be, for example, a phone number for the mobile computing device. The verification system can use the unique identifier to perform various functions in association with the mobile computing device or an application running on the mobile computing device. For example, the unique identifier can be used to login a user of the mobile computing device to an online service associated with an application executing on the mobile computing device. As another example, the unique identifier can be used to facilitate a purchase transaction.

In some implementations, the process 400 can include more or fewer steps. In some implementations, one or more steps of the process 400 can be performed in a different order. For example, the request for the unique identifier for the mobile computing device can be transmitted (414) prior to providing the verification challenge to the mobile computing device (408).

Figure 5:
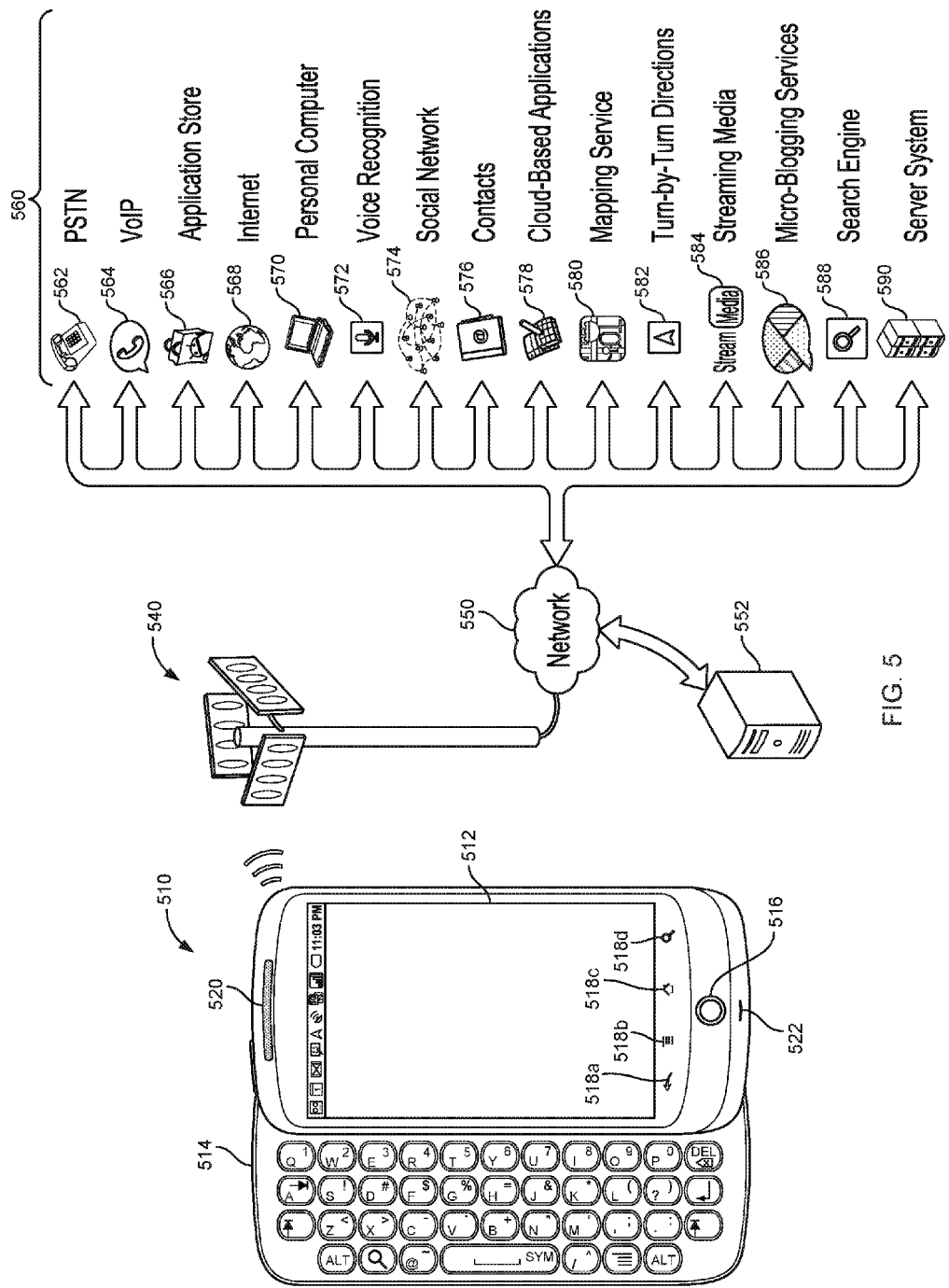
FIG. 5 is a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518*a*-*d*. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510.

Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
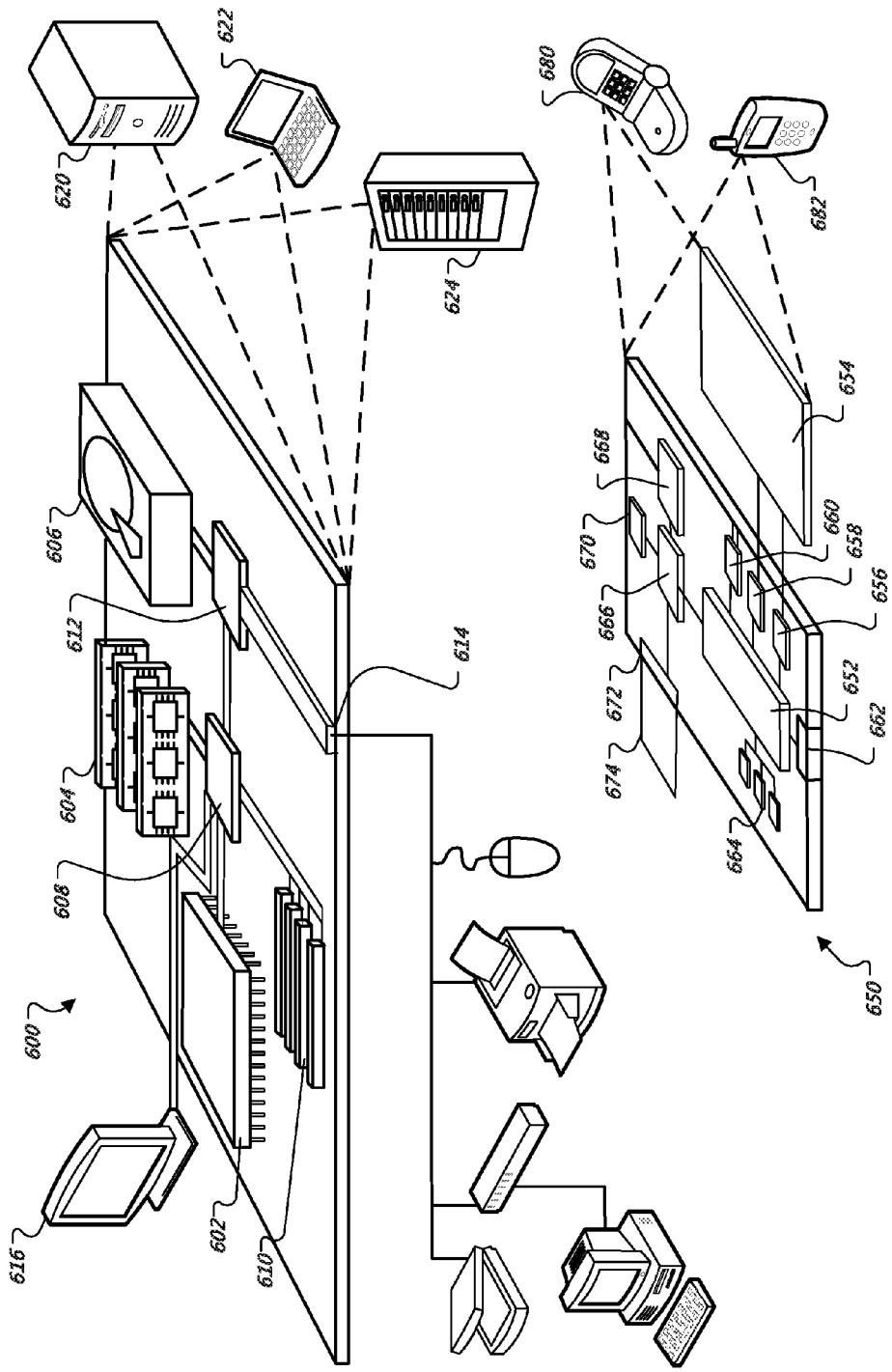
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Additionally, all references to the term "International Mobile Subscriber Identity" or IMSI are equally applicable to, and are intended to apply generally to, any type of hardware identifier. Furthermore, all references to a phone number for a mobile device are equally applicable to, and are intended to apply generally to, a unique identifier for a mobile device or other computing device. Accordingly, other implementations are within the scope of the following claims.

What is claimed is:

1. A computer-implemented method for identifying a mobile computing device, the method comprising:
   receiving, at an application server system and from a mobile computing device, an IP (Internet Protocol) formatted communication, the IP formatted communication including an International Mobile Subscriber Identity (IMSI) for the mobile computing device and a request to obtain a phone number for the mobile computing device, wherein a communication path along which the IP formatted communication is transmitted includes a packet switched IP network;
   transmitting, from the application server system to a communications carrier that provides the mobile computing device with wireless service, in response to the computing system receiving the IP formatted communication that includes the request to obtain the phone number for the mobile computing device, a verification request that includes the IMSI for the mobile computing device;
   receiving, from the communications carrier in response to the application server system having transmitted the verification request, a verification challenge value and an expected verification response value;
   providing, by the application server system and to the mobile computing device, the verification challenge value;
   receiving, at the application server system and from the mobile computing device, a calculated verification response that the mobile computing device calculated using both the verification challenge value and a cryptographic key stored at the mobile computing device;
   authenticating the mobile computing device, by the application server system, by determining that the calculated verification response matches the expected verification response value;
   transmitting, by the application server system to the communications carrier, a request for the telephone number for the mobile computing device, the request for the telephone number including the IMSI for the mobile computing device;
   receiving, by the application server system from the communications carrier, the phone number for the mobile computing device in response to the request for the phone number; and
   responsive to authenticating the mobile computing device, associating the mobile computing device with the telephone number received from the communications carrier.

2. The computer-implemented method of claim 1, wherein the application server system transmitting the verification request to the communications carrier causes the communications carrier to access a database of trusted entities to identify that the application server system is a trusted entity prior to providing the verification challenge value and the expected verification response value to the application server system.

3. The computer-implemented method of claim 1, wherein the IMSI for the mobile computing device identifies a Subscriber Identity Module (SIM) card of the mobile computing device.

4. The computer-implemented method of claim 1, wherein transmitting the verification request and the IMSI for the mobile computing device to the communications carrier includes communicating between the application server system and the communications carrier using Signaling System No. 7 (SS7) protocol.

5. The computer-implemented method of claim 1, wherein receiving the request to obtain the phone number from the mobile computing device includes receiving the request to obtain the phone number for the mobile computing device through a network of a different communications carrier than the communications carrier that provides the mobile computing device with wireless service.

6. The computer-implemented method of claim 1, further comprising using the phone number for the mobile computing device to access an account for a user of the mobile computing device.

7. The computer-implemented method of claim 1, wherein the request to obtain the phone number for the mobile computing device was initiated by an application running on the mobile computing device and the phone number is used by the application server system to route communications from a different instance of the application running on a different computing device to the application running on the computing device.

8. The computer-implemented method of claim 1, further comprising using the phone number by the application server system to log a user of the mobile computing device into an application running on the mobile computing device.

9. The computer-implemented method of claim 8, further comprising:
   using the phone number for the mobile computing device to authenticate the mobile computing device as a registered user of the application; and permitting a user of the mobile computing device to access certain features of the application in response to authenticating the mobile computing device using the phone number.

10. The computer-implemented method of claim 1, wherein:
the request to obtain the phone number for the mobile computing device was initiated by an application running on the mobile computing device; and
the application server system comprises an application server for the application running on the mobile computing device.

11. An application server system including:
one or more processors; and
one or more computer-readable devices including instructions that, when executed by the one or more processors, cause performance of operations that comprise:
receiving, at the application server system and from a mobile computing device, an IP (Internet Protocol) formatted communication, the IP formatted communication including an International Mobile Subscriber Identity (IMSI) for the mobile computing device and a request to obtain a phone number for the mobile computing device, wherein a communication path along which the IP formatted communication is transmitted includes a packet switched IP network;
transmitting, from the application server system to a communications carrier that provides the mobile computing device with wireless service, in response to the computing system receiving the IP formatted communication that includes the request to obtain the phone number for the mobile computing device, a verification request that includes the IMSI for the mobile computing device;
receiving, from the communications carrier in response to the application server system having transmitted the verification request, a verification challenge value and an expected verification response value;
providing, by the application server system and to the mobile computing device, the verification challenge value;
receiving, at the application server system and from the mobile computing device, a calculated verification response that the mobile computing device calculated using both the verification challenge value and a cryptographic key stored at the mobile computing device;
authenticating the mobile computing device, by the application server system, by determining that the calculated verification response matches the expected verification response value;
transmitting, by the application server system to the communications carrier, a request for the telephone number for the mobile computing device, the request for the telephone number including the IMSI for the mobile computing device;
receiving, by the application server system from the communications carrier, the phone number for the mobile computing device in response to the request for the phone number; and responsive to authenticating the mobile computing device, associating the mobile computing device with the telephone number received from the communications carrier.

12. The computing system of claim 11, wherein the application server system transmitting the verification request to the communications carrier causes the communications carrier to access a database of trusted entities to identify that the application server system is a trusted entity prior to providing the verification challenge value and the expected verification response value to the application server system.

13. The computing system of claim 11, wherein the IMSI for the mobile computing device identifies a Subscriber Identity Module (SIM) card of the mobile computing device.

14. The computing system of claim 11, wherein transmitting the verification request and the IMSI for the mobile computing device to the communications carrier includes communicating between the application server system and the communications carrier using Signaling System No. 7 (SS7) protocol.

15. The computing system of claim 11, wherein receiving the request to obtain the phone number from the mobile computing device includes receiving the request to obtain the phone number for the mobile computing device through a network of a different communications carrier than the communications carrier that provides the mobile computing device with wireless service.

16. The computing system of claim 11, further comprising using the phone number for the mobile computing device to access an account for a user of the mobile computing device.

17. The computing system of claim 11, wherein the request to obtain the phone number for the mobile computing device was initiated by an application running on the mobile computing device and the phone number is used by the application server system to route communications from a different instance of the application running on a different computing device to the application running on the computing device.

18. The computing system of claim 11, further comprising using the phone number by the application server system to log a user of the mobile computing device into an application running on the mobile computing device.

19. The computing system of claim 18, the operations further comprising:
using the phone number for the mobile computing device to authenticate the mobile computing device as a registered user of the application; and
permitting a user of the mobile computing device to access certain features of the application in response to authenticating the mobile computing device using the phone number.

20. The computing system of claim 11, wherein:
the request to obtain the phone number for the mobile computing device was initiated by an application running on the mobile computing device; and
the application server system comprises an application server for the application running on the mobile computing device.

* * * * *